Figure 1:
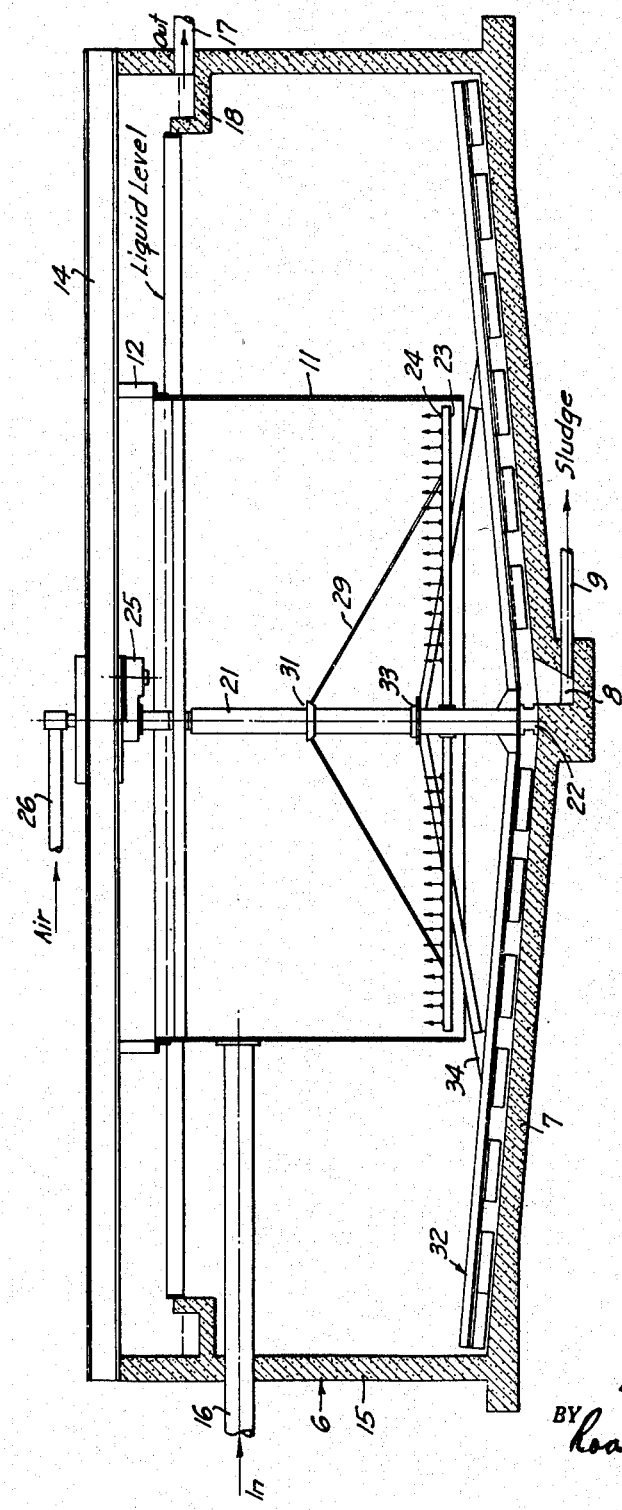

July 26, 1949.　　　　　E. M. KELLY　　　　　2,477,459
TREATMENT OF TURBID LIQUIDS
Filed Dec. 10, 1946　　　　　　　　　　　　　2 Sheets-Sheet 1

INVENTOR.
Earl M. Kelly
BY
ATTORNEY

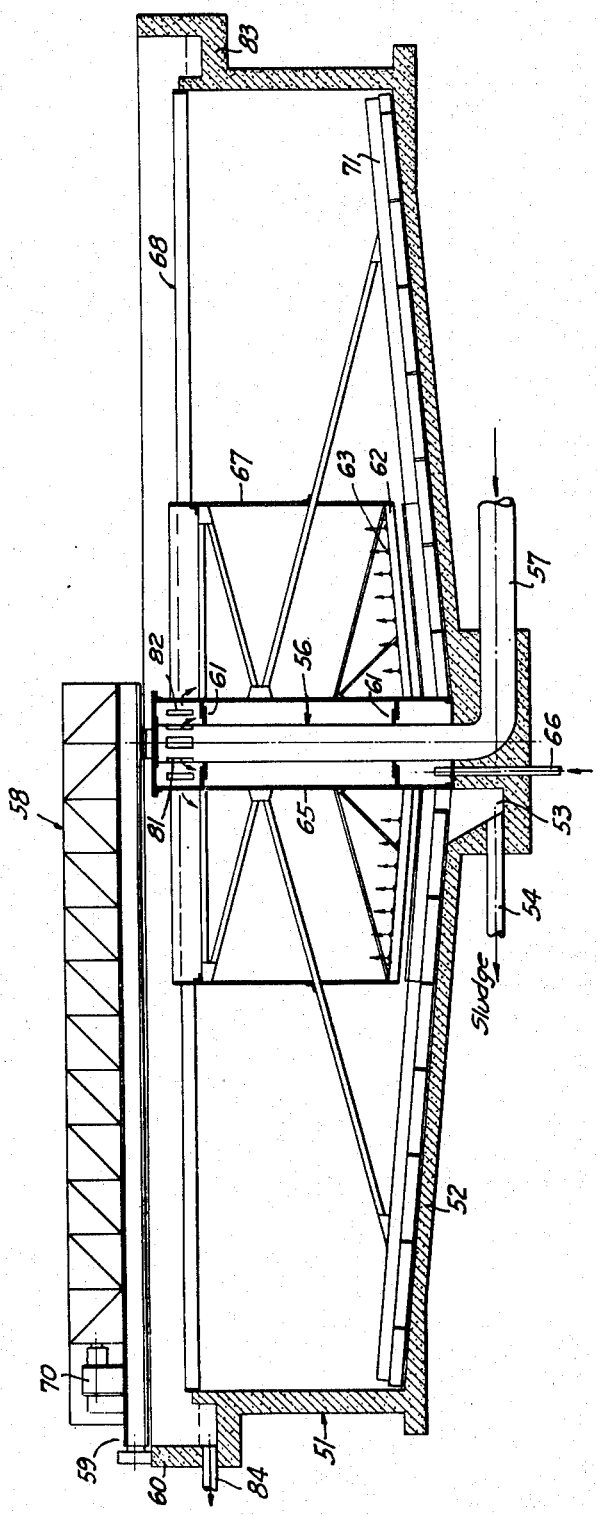

Patented July 26, 1949

2,477,459

UNITED STATES PATENT OFFICE 2,477,459

TREATMENT OF TURBID LIQUIDS

Earl M. Kelly, Los Angeles, Calif.

Application December 10, 1946, Serial No. 715,309

4 Claims. (Cl. 210—3)

This invention relates to a process and to an apparatus for the treatment of turbid liquid such as may be provided by raw sewage heavily laden with solids, or a like liquid. In fact, the apparatus and process of the present invention are particularly suited to the treatment of such a turbid liquid.

It is the generally broad object of the present invention to provide a novel process and a novel apparatus for the treatment of a turbid liquid heavily laden with solids having a relatively high biological oxygen demand as a raw sewage.

Another object of the present invention is to provide a process for the treatment of raw solid laden sewage to the end that the biological oxygen demand of such sewage may be quickly reduced and satisfactory clarification of the water effected in a relatively short time whereby the operation can be conducted in a vessel having such a volume relative to the rate of flow that the retention time is relatively short.

The invention includes other objects and features of advantage, some of which, together with the foregoing will appear hereinafter wherein the present preferred form of process of this invention is disclosed in conjunction with suitable apparatus, forming a part of the invention, for practicing the process of this invention.

Referring to the drawings accompanying and forming a part hereof, Figure 1 and Figure 2 are each a side elevation, partly in section, illustrating the construction of forms of apparatus which can be utilized successfully to practice the present invention.

Referring to the drawings and particularly to Figure 1 thereof, I have shown a tank 6 of generally circular outline and having a bottom 7 extending inwardly and sloping downwardly to a sludge pocket 8 and a sludge outlet line 9. Mounted concentrically with respect to the tank 6 is a circular shell 11 supported by hangers 12 from a beam 14 extending transversely of the tank; the shell is supported with its lower edge spaced from the tank bottom and its upper edge extending above the normal liquid level in the tank. An influent line 16 extends through a side wall 15 of the tank to discharge within shell 11. Clarified liquid is removed through effluent pipe 17, the overflow liquid being collected by a trough 18, to which the effluent pipe 17 is connected. A hollow shaft 21 is suitably supported in a bearing (not shown) on beam 14 and by a combined steady bearing and thrust bearing 22 positioned on the tank bottom. A motor 25 on the beam 14 rotates the shaft 21. A plurality of radial arms 23 extend from the hollow center shaft 21, each of the arms having a plurality of jet openings 24 therein. The upper end of shaft 21 is connected to an air inlet line 26 so that air admitted to the shaft 21 passes down through the shaft and out through the several arms 23 for release through the several jets 24. Each of the radial arms is secured and supported by a brace 29 from a collar 31 provided upon the hollow central shaft. The air can also be released from porous plates or tubes, if desired.

Also mounted upon and extending radially from shaft 21 are a plurality of sludge rakes indicated generally by numeral 32 and supported from a collar 33 on the hollow shaft 21 by braces 34. The sludge rakes are each formed to rake the sludge along the sloping tank bottom 7 to discharge the sludge finally into the sludge pocket 8.

In operation, heavily laden raw sewage, for example, is discharged through line 16 into the agitation-aeration compartment provided by the interior of the stationary inner compartment 11 while shaft 21 is rotated and air is released through the jets 24 to pass upwardly through the released sewage to sweep any odors in the sewage out of the sewage, to satisfy the biological oxygen demand and to effect a desired coagulation or coagmentation of solids therein. The solids which settle past the several arms 23 are of a settleable size and remain on the bottom of the tank to be moved along by the sludge rakes toward the sludge pocket 8. The sludge rakes positively return the settled sludge from the sedimentation compartment to the agitation compartment. Immediately upon entrance to this compartment a portion or all of the returned sludge will be raised by virtue of the air lift action of the introduced air and will be immediately mixed and circulated with the other contents of this compartment. It has been found in practice that the maintaining of a large volume of circulating solids tends to accelerate bacterial action with the consequent increase in rate of purification. Also the settling characteristics of the solids in the liquid are greatly improved, permitting rapid sedimentation in the outer compartment. There will be, of course, some sludge which will be positively raked to the sludge outlet but this, in main, will be the denser, heavier material which resists the circulating currents induced by the air. In the activated sludge process, aeration and sedimentation are carried out in separate tanks. Sludge from the sedimentation tank is continuously pumped back to the aeration tank for aeration in contact with the incoming solids. In the device of the present invention, this is accomplished by the operation of the sludge rakes. In the operation of sedimentation units on sewage, it is not possible to hold sludge in sedimentation units beyond a few hours because of the decomposing tendencies of the organic material present, which usually results in decreased purification and a floating of a considerable portion of the sludge load. For this reason the average clarifier, whether primary or secondary, in sewage treatment maintains detention periods within narrow limits of a few hours and sludge is removed usually every four hours or at least once every 24 hours. The introduction of air in the center compartment of the device of the present invention, combined with the positive pulling in of sludge from the outer sedimentation compartment, permits the holding of sludge for an indefinite period of time, since the air satisfies the oxygen demand tendencies and maintains the solids in a fresh state. This has considerable advantages in that it is possible to build up an appreciable concentration of solids which has a beneficial effect on both the purification and sedimentation characteristics of the liquid returned.

Normally the liquid level in tank 6 is maintained at the height of trough 18 and below the upper edge of shell 11 so that any effluent liquid issuing from the shell 11 must pass out between the lower end of the shell and the bottom of the tank to issue finally into the sedimentation compartment provided between the shell 11 and tank 6. In this manner, the biological demand of the heavily solid laden sewage can be readily satisfied, the desired flocculation or coagmentation of the finely divided solids present in sewage can be effected, the gases present in the sewage swept out and the biological demand of the sewage and of the turbid liquid satisfied to the end that finally there can be discharged a clarified liquid in a relatively short period of time.

Referring to that form of the invention shown in Figure 2, I have there indicated a suitable tank 51 having a bottom 52 sloping inwardly and downwardly to a sludge pocket 53 and from which sludge can be removed through line 54.

Centrally of the tank 51 is provided an influent conduit indicated generally by numeral 56 and connected to an influent conduit 57 through which is introduced the heavily laden raw sewage or other turbid liquid. The upper end of conduit 56 is secured to a beam 58 which extends outwardly from a carriage 59 mounted for movement alongside wall 60 of the tank 51 by motor 70. Mounted concentrically in the tank and surrounding the conduit 56 is a tubular shell 65 sealed from the conduit by suitable sealing means indicated generally by numeral 61. A plurality of hollow tubular arms 62 extend radially from the tubular shell 65, each of the arms having a plurality of jet openings 63 therein to release air admitted to the interior of the arms. Each of the arms 62 is additionally supported from the tubular shell by suitable braces. An air inlet pipe 66 supplies air to the interior of the shell 65 for admission to and release from each of the radially extending arms 62.

Mounted upon the extending ends of the radial arms 62 and spaced from the tank bottom is a vertical annular shell 67 extending upwardly from the arms above the normal water level which is maintained in the tank and which is generally as is indicated by line 68. Sludge rakes 71 are mounted upon shell 65 to move sludge in toward the center of the tank over the bottom until the sludge falls into the sludge pocket 53.

The interior of the shell 67 provides an agitation-aeration compartment while the region between the shell 67 and the tank 51 provides a sedimentation compartment. Sludge falling to the bottom of tank 51 beneath either the sedimentation compartment or the agitation compartment is moved by sludge rakes 71 into sludge pocket 53.

In operation, the influent is admitted through line 57 and issues from the influent column 56 and through the shell 65 through the apertures 81 and 82 therein. At the same time, air is admitted through the several jets 63 into the radially extending arms 62 to sweep out any gases carried in the influent liquid, to satisfy any biological oxygen demand of the liquid, to coagment or flocculate settleable solids in the fluid. The influent liquid, of course, displaces some of the liquid in the agitation compartment, the displaced liquid passing between the shell 67 and the bottom of the tank upwardly into the sedimentation zone in which further sedimentation and coagmentation may take place until finally, the effluent liquid is collected and discharged by trough 83 into the effluent line 84. The rotation of the air discharge arms 62 and the sludge rakes ensures thorough and uniform treatment of the liquid in the tank.

I claim:

1. Apparatus for sewage treatment comprising a tank, a hollow shaft rotatably mounted centrally of said tank, a plurality of arms extending radially from said shaft to a point intermediate said shaft and the outer wall of the tank, and spaced above but adjacent to the tank bottom, sediment discharge means for discharging sediment, a plurality of radial sediment rakes extending from said shaft to closely adjacent said tank wall to move sediment on the tank bottom to said sediment discharge means, air discharge means on said radial arms, means for supplying air to said air discharge means, outflow means by which clarified liquid is drawn off adjacent the outer tank periphery, an annular shell supported on the radial arms adjacent the ends of the radial arms and extending above the elevation of the outflow means and depending to below the level of the radial arms but spaced from the tank bottom, means for rotating said shaft, and liquid feeding means for discharging liquid upwardly through said shaft and into said shell.

2. In sewage treatment apparatus having a tank, sediment discharge means in the bottom of the tank near the center, liquid outflow means at the periphery of the tank near the top, and a rake arm disposed just above the tank bottom and rotatable about its center to move sediment from the lower periphery of the tank to the sediment discharge means, the combination which comprises an upright central shaft in the tank, means for rotating the shaft, a hollow air discharge arm fastened rigidly to the shaft and extending outwardly in the tank part way to the periphery and above the rake arm, the air discharge arm being perforated along its length at a plurality of points, means for supplying air under pressure to the air discharge arm through the shaft, an annular baffle disposed in the tank adjacent the path of the outside end of the air discharge arm and extending from a level immediately above the rake arm to a level above that of the liquid discharge, and means for introducing the sewage to be treated into the space within the baffle.

3. In sewage treatment apparatus having a tank, sediment discharge means in the bottom of the tank near the center, liquid outflow means at the periphery of the tank near the top, and a rake arm disposed just above the tank bottom and rotatable about its center to move sediment from the lower periphery of the tank to the sediment discharge means, the combination which comprises an upright central shaft in the tank, means for rotating the shaft, a hollow air discharge arm fastened rigidly to the shaft and extending outwardly in the tank part way to the periphery and above the rake arm, the air discharge arm being perforated along its length at a plurality of points, means for supplying air under pressure to the air discharge arm through the shaft, an annular baffle supported by the air discharge arm and disposed in the tank adjacent the path of the outside end of the air discharge arm and extending from a level immediately above the rake arm to a level above that of the liquid discharge, and means for introducing the sewage to be treated into the space within the baffle.

4. In sewage treatment apparatus having a tank, sediment discharge means in the bottom of the tank near the center, liquid outflow means at the periphery of the tank near the top, and a rake arm disposed just above the tank bottom and rotatable about its center to move sediment from the lower periphery of the tank to the sediment discharge means, the combination which comprises an upright central shaft in the tank, means for rotating the shaft, a hollow air discharge arm fastened rigidly to the shaft and extending outwardly in the tank part way to the periphery and above the rake arm, the air discharge arm being perforated along its length at a plurality of points, means disposed within the shaft for supplying air under pressure to the air discharge arm through the shaft bottom, an annular baffle disposed in the tank adjacent the path of the outside end of the air discharge arm and extending from a level immediately above the rake arm to a level above that of the liquid discharge, and means for introducing the sewage to be treated into the space within the baffle.

EARL M. KELLY.

REFERENCES CITED

The following references are of record in the file of this patent:

UNITED STATES PATENTS

| Number | Name | Date |
| --- | --- | --- |
| 2,138,349 | Mallory | Nov. 29, 1938 |
| 2,223,257 | Mallory | Nov. 26, 1940 |
| 2,355,069 | Green | Aug. 8, 1944 |
| 2,400,598 | Prager | May 21, 1946 |
| 2,404,701 | Felsecker | July 23, 1946 |